United States Patent
Kaneko et al.

(10) Patent No.: US 6,529,472 B1
(45) Date of Patent: Mar. 4, 2003

(54) GENERATION AND DECODING OF MULTI-CARRIER SIGNAL

(75) Inventors: Keiichi Kaneko, Atsugi (JP); Katsumi Takaoka, Yokosuka (JP); Kazunari Matsui, Yokohama (JP); Takaaki Saiki, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/370,889

(22) Filed: Aug. 10, 1999

(30) Foreign Application Priority Data

Sep. 30, 1998 (JP) ............................................ 10-277103

(51) Int. Cl.$^7$ ................................................ H04J 11/00
(52) U.S. Cl. ........................ 370/208; 370/210; 375/260
(58) Field of Search ................................. 370/203, 204, 370/206, 208–210, 480–482; 375/200, 260

(56) References Cited

U.S. PATENT DOCUMENTS

| | | | | |
|---|---|---|---|---|
| 4,053,713 A | * | 10/1977 | Nitadori | ...................... 370/206 |
| 5,504,783 A | * | 4/1996 | Tomisato et al. | ............ 375/267 |
| 5,548,583 A | * | 8/1996 | Bustamante | ................. 370/335 |
| 5,555,268 A | * | 9/1996 | Fattouche et al. | ........... 375/141 |
| 5,570,349 A | * | 10/1996 | Bustamante et al. | ......... 370/335 |
| 5,734,639 A | * | 3/1998 | Bustamante et al. | ......... 370/208 |

FOREIGN PATENT DOCUMENTS

JP 9-266466 10/1997

* cited by examiner

*Primary Examiner*—Hassan Kizou
*Assistant Examiner*—Andrew M. Waxman
(74) *Attorney, Agent, or Firm*—Louis Woo

(57) ABSTRACT

A first orthogonal-multi-carrier signal is generated through N-point inverse discrete Fourier transform. The first orthogonal-multi-carrier signal has "N" or less orthogonal multiple carriers, where "N" denotes a predetermined natural number equal to or greater than 2. Every 1-unit time segment of the first orthogonal-multi-carrier signal is repeated "M" times to generate every 1-symbol time segment of a second orthogonal-multi-carrier signal. The second orthogonal-multi-carrier signal has a thinned set of "N" or less orthogonal multiple carriers spaced at M-carrier intervals, where "M" denotes a predetermined natural number equal to or greater than 2.

10 Claims, 4 Drawing Sheets

GENERATION AND DECODING OF MULTI-CARRIER SIGNAL

BACKGROUND OF THE INVENTION

1. Field of the Invention

This invention relates to a method and an apparatus for generating a signal having a set of orthogonal multiple carriers modulated in accordance with information to be transmitted. Also, this invention relates to a method and apparatus for decoding or demodulating an orthogonal-multi-carrier signal into data or information.

2. Description of the Related Art

Orthogonal frequency division multiplexing (OFDM) employs multiple carriers which are orthogonal with respect to each other. The "orthogonal" multiple carriers mean that the spectrums of carriers neighboring one carrier are null at the frequency of the latter carrier. The multiple carriers are modulated in accordance with digital information pieces to be transmitted, respectively. For example, phase modulation or quadrature amplitude modulation is used by the carrier modulation. The modulation-resultant multiple carriers are combined into an OFDM signal which has a form as a random signal.

Generally, an OFDM transmitter side uses inverse discrete Fourier transform (IDFT) in generating an OFDM signal, that is, an orthogonal-multi-carrier signal. Specifically, information pieces to be transmitted are subjected to IDFT in frequency domain, being converted into an OFDM signal in time domain. An OFDM receiver side demodulates a received OFDM signal into frequency-domain information pieces through discrete Fourier transform (DFT).

Regarding an OFDM transmission system, it is desirable to use some carriers (for example, alternate carriers) among a full set, that is, an unthinned set of orthogonal multiple carriers in a limited frequency band. Such a carrier thinning technique is advantageous in reducing a system cost and meeting a power reducing requirement.

A consideration will be given of the case where "m" carriers spaced at "n"-carrier intervals are used among an unthinned set, that is, a full set of "n×m" orthogonal multiple carriers where "×" denotes multiplication or product. Even in this case, an n×m-point IDFT circuit is employed which can generate "n×m" orthogonal multiple carriers. Here, "n×m" orthogonal multiple carriers are separated into "m" groups each having "n" neighboring carriers. The n×m-point IDFT circuit is operated so that one carrier of each of the "m" groups will be modulated in accordance with a corresponding effective information piece while (n−1) remaining carriers in each group will be modulated in accordance with zero data pieces and thus be prevented from actually appearing. In other words, the (n−1) remaining carriers in each group are set as carrier holes. The n×m-point IDFT circuit tends to be large in scale and high in cost.

Regarding OFDM transmission, it is known to assign some carriers among orthogonal multiple carriers to pilot signals other than main information pieces to be transmitted.

SUMMARY OF THE INVENTION

It is a first object of this invention to provide an inexpensive method of generating an orthogonal-multi-carrier signal.

It is a second object of this invention to provide an inexpensive apparatus for generating an orthogonal-multi-carrier signal.

It is a third object of this invention to provide an inexpensive method of decoding or demodulating an orthogonal-multi-carrier signal into data or information.

It is a fourth object of this invention to provide an inexpensive apparatus for decoding or demodulating an orthogonal-multi-carrier signal into data or information.

A first aspect of this invention provides a method comprising the steps of generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; and repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2.

A second aspect of this invention provides a method comprising the steps of dividing every 1-symbol time segment of a first orthogonal-multi-carrier signal into "M" successive 1/M-symbol time segments, the first orthogonal-multi-carrier signal having a thinned set of "N" or less orthogonal multiple carriers spaced at M-carrier intervals, where "M" denotes a predetermined natural number equal to or greater than 2, and "N" denotes a predetermined natural number equal to or greater than 2; adding and averaging at least two of the "M" successive 1/M-symbol time segments of the first orthogonal-multi-carrier signal into a 1-unit time segment of a second orthogonal-multi-carrier signal; and subjecting the second orthogonal-multi-carrier signal to N-point discrete Fourier transform for every unit time interval.

A third aspect of this invention provides a method comprising the steps of generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2; generating a third orthogonal-multi-carrier signal through M×N-point inverse discrete Fourier transform, the third orthogonal-multi-carrier signal having "M×N-L" orthogonal multiple carriers, where "L" denotes a predetermined natural number equal to or greater than the number "N"; and combining the second orthogonal-multi-carrier signal and the third orthogonal-multi-carrier signal into a fourth orthogonal-multi-carrier signal.

A fourth aspect of this invention is based on the third aspect thereof, and provides a method further comprising the steps of dividing every 1-symbol time segment of the fourth orthogonal-multi-carrier signal into "M" successive 1/M-symbol time segments; adding and averaging at least two of the "M" successive 1/M-symbol time segments of the fourth orthogonal-multi-carrier signal into a 1-unit time segment of a fifth orthogonal-multi-carrier signal; and subjecting the fifth orthogonal-multi-carrier signal to N-point discrete Fourier transform for every unit time interval.

A fifth aspect of this invention is based on the third aspect thereof, and provides a method wherein the third orthogonal-multi-carrier signal contains a pilot signal.

A sixth aspect of this invention provides an apparatus comprising means for generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; and means for repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2.

A seventh aspect of this invention provides an apparatus comprising means for dividing every 1-symbol time segment of a first orthogonal-multi-carrier signal into "M" successive 1/M-symbol time segments, the first orthogonal-multi-carrier signal having a thinned set of "N" or less orthogonal multiple carriers spaced at M-carrier intervals, where "M" denotes a predetermined natural number equal to or greater than 2, and "N" denotes a predetermined natural number equal to or greater than 2; means for adding and averaging at least two of the "M" successive 1/M-symbol time segments of the first orthogonal-multi-carrier signal into a 1-unit time segment of a second orthogonal-multi-carrier signal; and means for subjecting the second orthogonal-multi-carrier signal to N-point discrete Fourier transform for every unit time interval.

An eighth aspect of this invention provides an apparatus comprising means for generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; means for repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2; means for generating a third orthogonal-multi-carrier signal through M×N-point inverse discrete Fourier transform, the third orthogonal-multi-carrier signal having "M×N−L" orthogonal multiple carriers, where "L" denotes a predetermined natural number equal to or greater than the number "N"; and means for combining the second orthogonal-multi-carrier signal and the third orthogonal-multi-carrier signal into a fourth orthogonal-multi-carrier signal.

A ninth aspect of this invention is based on the eighth aspect thereof, and provides an apparatus further comprising means for dividing every 1-symbol time segment of the fourth orthogonal-multi-carrier signal into "M" successive 1/M-symbol time segments; means for adding and averaging at least two of the "M" successive 1/M-symbol time segments of the fourth orthogonal-multi-carrier signal into a 1-unit time segment of a fifth orthogonal-multi-carrier signal; and means for subjecting the fifth orthogonal-multi-carrier signal to N-point discrete Fourier transform for every unit time interval.

A tenth aspect of this invention is based on the eighth aspect thereof, and provides an apparatus wherein the third orthogonal-multi-carrier signal contains a pilot signal.

DESCRIPTION OF THE PREFERRED EMBODIMENTS

First Embodiment

A baseband OFDM (orthogonal frequency division multiplexed) signal is composed of orthogonal multiple baseband carriers which have been modulated in accordance with transmitted information pieces respectively. Data transmission (information transmission) based on OFDM is executed symbol by symbol. Each OFDM transmission 1-symbol interval is equal to a predetermined time interval, for example, 20 $\mu$s. A time interval of 20 $\mu$s corresponds to 50 kHz in frequency.

Figure 1:
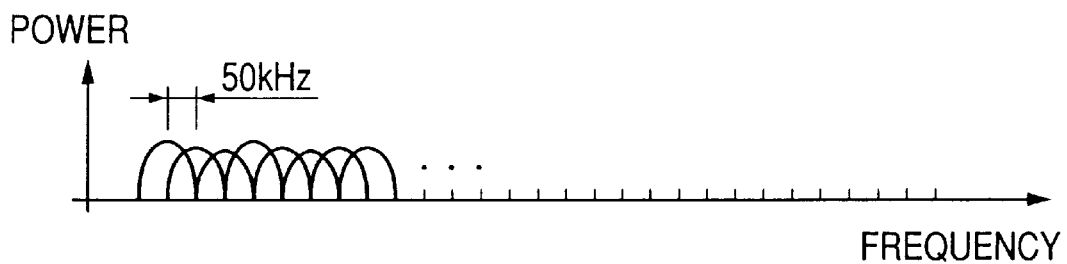
FIG. 1 is a diagram of a frequency spectrum of an OFDM signal having an unthinned set of orthogonal multiple carriers.

With reference to FIG. 1, in the case where each OFDM transmission 1-symbol interval is equal to 20 $\mu$s, orthogonal multiple baseband carriers which form a full set, that is, an unthinned set for a baseband OFDM signal are spaced at intervals of 50 kHz (1-carrier intervals). For example, 1024 (=128×8) orthogonal multiple baseband carriers form an unthinned set, where "x" means multiplication or product. In this case, a baseband OFDM signal is generated by subjecting information pieces to 1024-point IDFT (inverse discrete Fourier transform).

Figure 2:
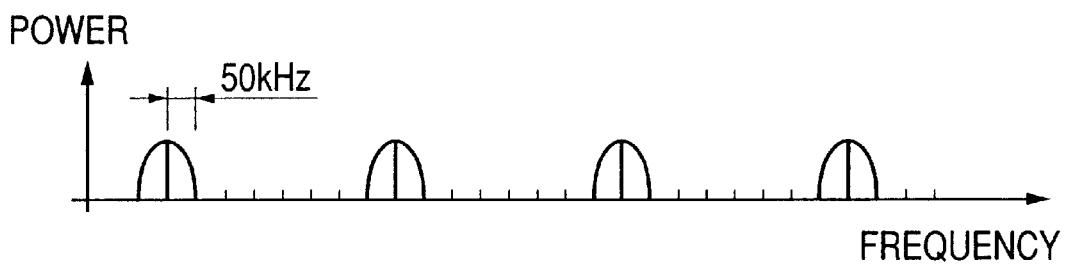
FIG. 2 is a diagram of a frequency spectrum of an OFDM signal having a thinned set of orthogonal multiple carriers.

A background-art OFDM signal generator uses a 1024-point (128×8-point) IDFT circuit and implements a carrier thinning process. Specifically, "128×8" orthogonal multiple baseband carriers are separated into "128" groups each having 8 neighboring baseband carriers. The 128×8-point IDFT circuit is operated so that one baseband carrier of each of the "128" groups will be modulated in accordance with a corresponding effective information piece while 7 (=8−1) remaining baseband carriers in each group will be modulated in accordance with zero data pieces and thus be prevented from actually appearing. In other words, the 7 remaining baseband carriers in each group are set as carrier holes. In this case, as shown in FIG. 2, a baseband OFDM signal has a thinned set of 128 orthogonal multiple baseband carriers spaced at 8-carrier intervals.

Figure 3:
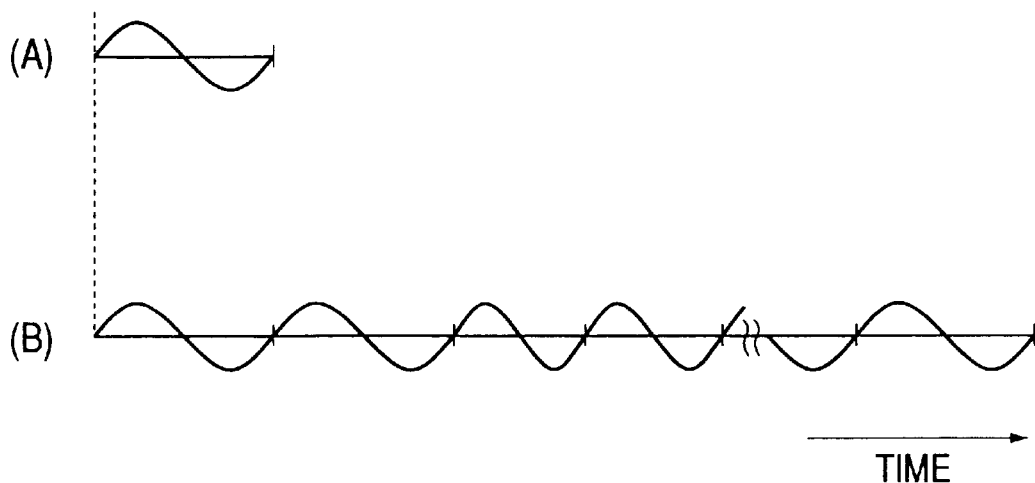
FIG. 3 is a time-domain diagram of a 1-unit waveform represented by a fundamental frequency component of a digital OFDM signal, and a 1-symbol waveform represented by an 8-th frequency component of a digital OFDM signal.

A first embodiment of this invention generates a first digital OFDM signal by subjecting information pieces to 128-point IDFT. The execution of 128-point IDFT for every unit time interval generates every 1-unit-corresponding time segment of a first digital OFDM signal. An example of the 1-unit waveform represented by a fundamental frequency component of the first digital OFDM signal is shown in the portion (A) of FIG. 3. In the first embodiment of this invention, every 1-unit-corresponding time segment of the first digital OFDM signal is repeated 8 times to generate every 1-symbol-corresponding time segment of a second digital OFDM signal which is equivalent to a digital OFDM signal resulting from 1024-point IDFT with a carrier thinning process. An example of the 1-symbol waveform represented by an 8-th frequency component of the second digital OFDM signal is shown in the portion (B) of FIG. 3. Every symbol interval of the second digital OFDM signal is equal to 20 µm. A D/A converter changes the second baseband OFDM signal into an analog baseband OFDM signal in response to a sample clock signal having a frequency of 51.2 MHz (=50 kHz×1024).

As a result of the 8-times repeat of every 1-unit-corresponding time segment of the first digital OFDM signal, a direct-current component of the first digital OFDM signal causes a direct-current component of the second digital OFDM signal. On the other hand, a 1-period-corresponding time segment of a fundamental frequency component of the first digital OFDM signal is multiplied to an 8-period-corresponding time segment which forms a 1-symbol-corresponding time segment of an 8-th frequency component of the second digital OFDM signal. In addition, a 2-period-corresponding time segment of a second frequency component of the first digital OFDM signal is multiplied to a 16-period-corresponding time segment which forms a 1-symbol-corresponding time segment of a 16-th frequency component of the second digital OFDM signal. A 3-period-corresponding time segment of a third frequency component of the first digital OFDM signal is multiplied to a 24-period-corresponding time segment which forms a 1-symbol-corresponding time segment of a 24-th frequency component of the second digital OFDM signal. A 4-period-corresponding time segment of a fourth frequency component of the first digital OFDM signal is multiplied to a 32-period-corresponding time segment which forms a 1-symbol-corresponding time segment of a 32-nd frequency component of the second digital OFDM signal. A 5-period-corresponding time segment of a fifth frequency component of the first digital OFDM signal is multiplied to a 40-period-corresponding time segment which forms a 1-symbol-corresponding time segment of a 40-th frequency component of the second digital OFDM signal. Generally, a k-period-corresponding time segment of a k-th frequency component of the first digital OFDM signal is multiplied to a k×8-period-corresponding time segment which forms a 1-symbol-corresponding time segment of a k×8-th frequency component of the second digital OFDM signal.

As previously mentioned, the first digital OFDM signal results from 128-point IDFT. An example of the frequency spectrum represented by the first digital OFDM signal is shown in the portion (A) of FIG. 4. The first digital OFDM signal has components corresponding to an unthinned set, that is, a full set of orthogonal multiple carriers. An example of the frequency spectrum represented by the second digital OFDM signal is shown in the portion (B) of FIG. 4. The second digital OFDM signal consists of components corresponding to a thinned set of 128 orthogonal multiple carriers spaced at 8-carrier intervals.

Figure 4:
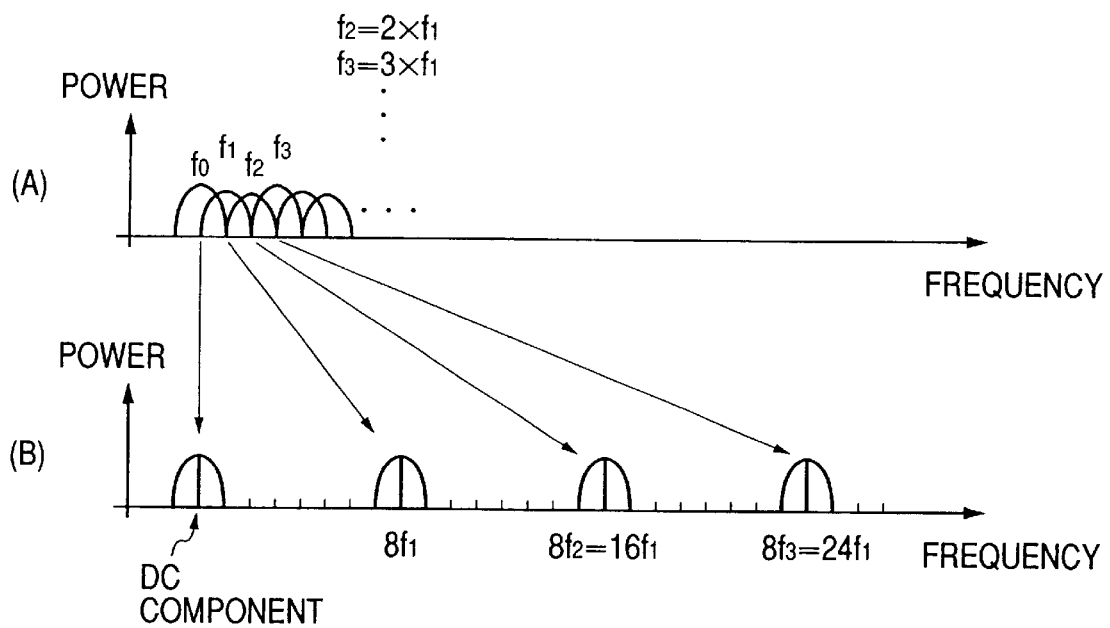
FIG. 4 is a diagram of a frequency spectrum of an OFDM signal having an unthinned set of orthogonal multiple carriers, and a frequency spectrum of an OFDM signal having a thinned set of orthogonal multiple carriers.

As shown in FIG. 4, a direct-current component of the first digital OFDM signal causes a direct-current component of the second digital OFDM signal. In addition, a fundamental frequency component of the first digital OFDM signal causes an 8-th frequency component of the second digital OFDM signal. A second frequency component of the first digital OFDM signal causes a 16-th frequency component of the second digital OFDM signal. A third frequency component of the first digital OFDM signal causes a 24-th frequency component of the second digital OFDM signal.

Figure 5:
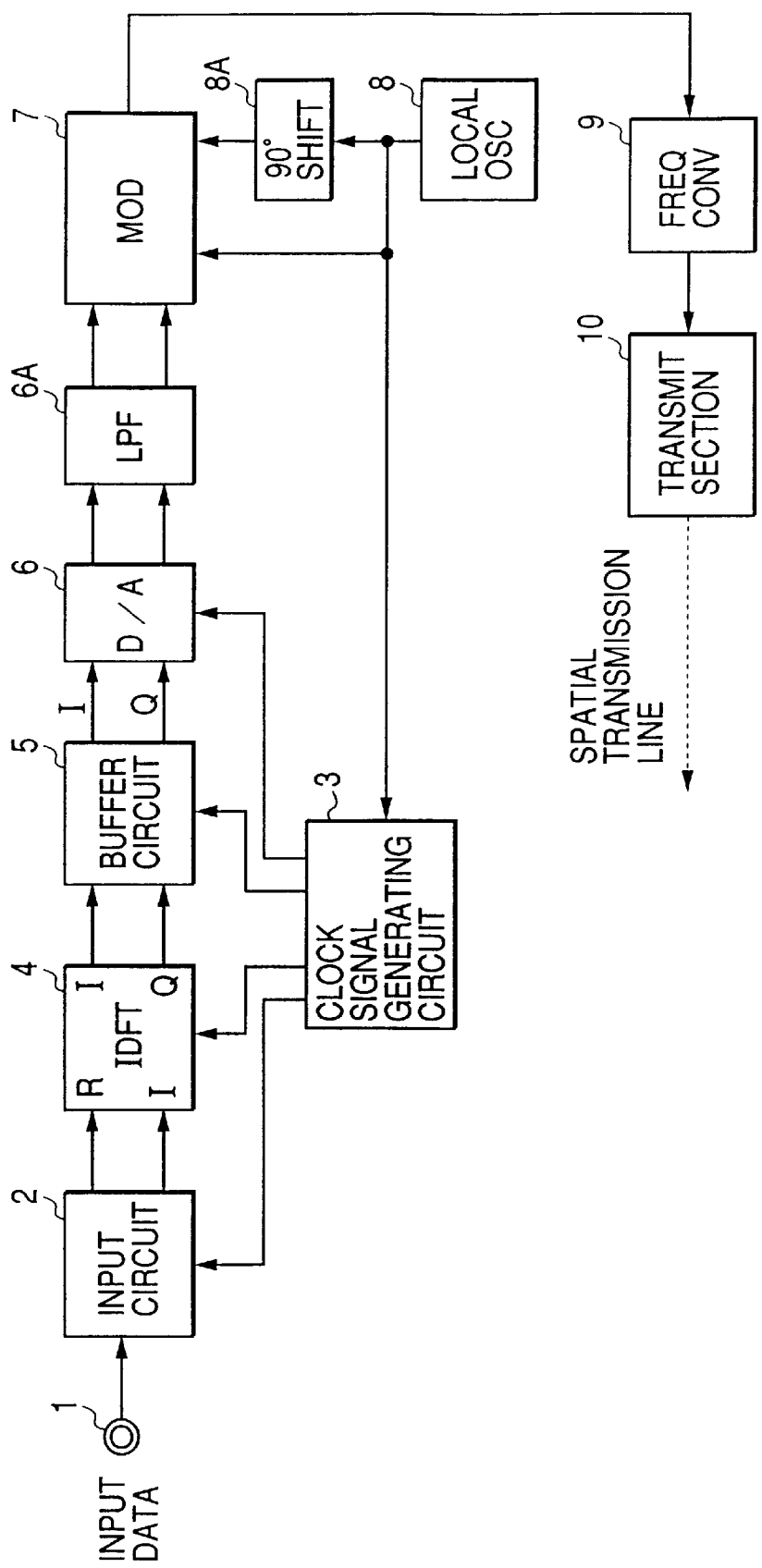
FIG. 5 is a block diagram of a signal transmitting apparatus including a multi-carrier signal generation apparatus according to a first embodiment of this invention.

FIG. 5 shows a signal transmitting apparatus including a multi-carrier signal generation apparatus (an OFDM signal generation apparatus) according to the first embodiment of this invention. Digital data transmitted by the signal transmitting apparatus of FIG. 5 is equal to, for example, a combination of a video signal and an audio signal.

OFDM uses multiple carriers having an orthogonal relationship with each other. In OFDM data transmission, independent digital information pieces are transmitted by using multiple carriers respectively. Since the multiple carriers are orthogonal with each other, the levels of the spectrums of carriers neighboring a given carrier are nullified at a point corresponding to the frequency of the given carrier.

With reference to FIG. 5, a digital information signal in the form of a bit stream is fed via an input terminal 1 to an input circuit 2. The digital information signal represents main information to be transmitted. The digital information signal results from, for example, compressing an audio information signal, a video information signal, or a video/audio information signal according to an MPEG encoding process. The input circuit 2 adds an error correction code (ECC) to the digital information signal in response to a clock signal fed from a clock signal generating circuit 3.

The input circuit 2 subjects the resultant ECC-added digital information signal to serial-to-parallel (S/P) conversion in response to the clock signal fed from the clock signal generating circuit 3. During the S/P conversion, the digital information signal is divided into parallel signals corresponding to modulating signals for QAM (quadrature amplitude modulation) respectively. The input circuit 2 outputs the parallel signals as the modulating signals.

The input circuit 2 outputs a first set of "J" parallel digital signals, and a second set of "J" parallel digital signals for every unit time interval. Here, "J" denotes a predetermined natural number equal to or less than 128. The first set and the second set correspond to a real part and an imaginary part (an in-phase signal and a quadrature signal, that is, an I signal and a Q signal) respectively.

In the case where the number "J" is less than 128, the "J" output signals from the input circuit 2 and a given signal or given signals are grouped into 128 input signals in each of the real part and the imaginary part. Generally, the given signal or the given signals are designed to generate a reference frequency signal and pilot signals. The 128 input signals in each of the real part and the imaginary part are fed to an IDFT (inverse discrete Fourier transform) device 4. The IDFT device 4 operates in response to a clock signal fed from the clock signal generating circuit 3. The 128 input signals in the real part and the 128 input signals in the imaginary part are subjected to 128-point IDFT by the IDFT device 4 for every unit time interval. Regarding each of the real part and the imaginary part, the operation of the IDFT device 4 corresponds to subjecting 128 carriers to QAM responsive to the 128 input signals respectively. In each of the real part and the imaginary part, the 128 input signals are assigned to the 128 carriers respectively. In each of the real part and the imaginary part, the IDFT device 4 generates the 128 modulation-resultant signals in response to the 128 input signals respectively. The IDFT device 4 combines the 128 modulation-resultant signals of the real part into a multiplexing-resultant signal (a composite I signal) corresponding to the real part. The IDFT device 4 outputs the multiplexing-resultant signal corresponding to the real part. Also, the IDFT device 4 combines the 128 modulation-resultant signals of the imaginary part into a multiplexing-resultant signal (a composite Q signal) corresponding to the imaginary part. The IDFT device 4 outputs the multiplexing-resultant signal corresponding to the imaginary part.

The IDFT device 4 is of the 128-point type. The 128-point IDFT device 4 is simpler in structure and lower in cost than a 1024-point IDFT device.

The output signals of the IDFT device 4 are stored into a memory within a buffer circuit 5 unit by unit. During every period corresponding to a guard interval in one symbol interval, the buffer circuit 5 reads out at least portions of 1-unit-corresponding signal segments from the internal memory in response to a clock signal fed from the clock signal generating circuit 3. During every period corresponding to an effective symbol interval in one symbol interval, the buffer circuit 5 repetitively reads out the wholes of 1-unit-corresponding signal segments from the internal memory a given number of times (specifically, 8 times) in response to the clock signal fed from the clock signal generating circuit 3. The buffer circuit 7 outputs the readout signals symbol by symbol. It should be noted that one symbol interval is equal to one guard interval plus one effective symbol interval.

A time-base contraction process may be implemented during the repetitive readout of the 1-unit-corresponding signal segments from the memory within the buffer circuit 5.

Output signals of the buffer circuit 5 are fed to a D/A converter 6, being converted into corresponding analog signals thereby. The D/A converter 6 operates in response to a clock signal fed from the clock signal generating circuit 3. The D/A converter 6 outputs the resultant analog signals to an LPF (a low pass filter) 6A. Only components of the output signals of the D/A converter 6 in a desired frequency band are passed through the LPF 6A.

Output signals of the LPF 6A which correspond to the real part and the imaginary part are fed to a quadrature modulator 7 as baseband signals. A local oscillator 8 outputs a given-frequency signal to the quadrature modulator 7. The frequency of the output signal of the local oscillator 8 corresponds to a given intermediate frequency (IF). The local oscillator 8 also outputs the given-frequency signal to a 90° phase shifter 8A. The device 8A shifts the phase of the given-frequency signal by 90°, and outputs the phase-shift resultant signal to the quadrature modulator 7. In this way, a pair of given-frequency signals having a quadrature relation are fed to the quadrature modulator 7. In the quadrature modulator 7, the quadrature given-frequency signals are modulated in accordance with the baseband signals outputted from the LPF 6A so that the baseband signals are converted into an IF OFDM (intermediate frequency OFDM) signal. The IF OFDM signal has 128 IF orthogonal multiple carriers which are modulated as indications of the output baseband signals of the LPF 6A.

The IF OFDM signal is outputted from the quadrature modulator 7 to a frequency converter 9. The IF OFDM signal is changed by the frequency converter 9 into an RF OFDM (radio frequency OFDM) signal in a desired frequency band for transmission. The RF OFDM signal has 128 RF orthogonal multiple carriers which are modulated as indications of the output baseband signals of the LPF 6A respectively. The frequency converter 9 includes a local oscillator and a mixer. In the frequency converter 9, the IF OFDM signal and the output signal of the local oscillator are mixed by the mixer so that the IF OFDM signal is converted into the RF OFDM signal.

The RF OFDM signal is fed to a transmitting section 10 from the frequency converter 9. The transmitting section 10 includes a linear power amplifier and a transmission antenna. The RF OFDM signal is fed via the linear power amplifier to the transmission antenna, being radiated by the transmission antenna into a spatial transmission line (the air). In general, the central-frequency carrier among the multiple carriers in the RF OFDM signal is assigned to a reference frequency signal.

The output signal of the local oscillator 8 is also fed to the clock signal generating circuit 3. The clock signal generating circuit 3 produces clock signals in response to the output signal of the local oscillator 8 by frequency dividing processes, and outputs the generated clock signals to the input circuit 2, the IDFT device 4, the buffer circuit 5, and the D/A converter 6 as operation timing control signals, respectively.

The first embodiment of this invention includes a decoding side which processes a first digital OFDM signal having a thinned set of 128 orthogonal multiple carriers. Specifically, the decoding side divides every 1-symbol time segment of the first digital OFDM signal into eight successive 1/8-symbol time segments. The decoding side adds and averages at least two of the eight successive 1/8-symbol time segments of the first digital OFDM signal into a 1-unit time segment of a second digital OFDM signal. For every unit time interval, the decoding side subjects the second digital OFDM signal to processing which corresponds to 128-point complex discrete Fourier transform (128-point DFT). Transmitted digital information is recovered from the DFT-resultant signal.

Figure 6:
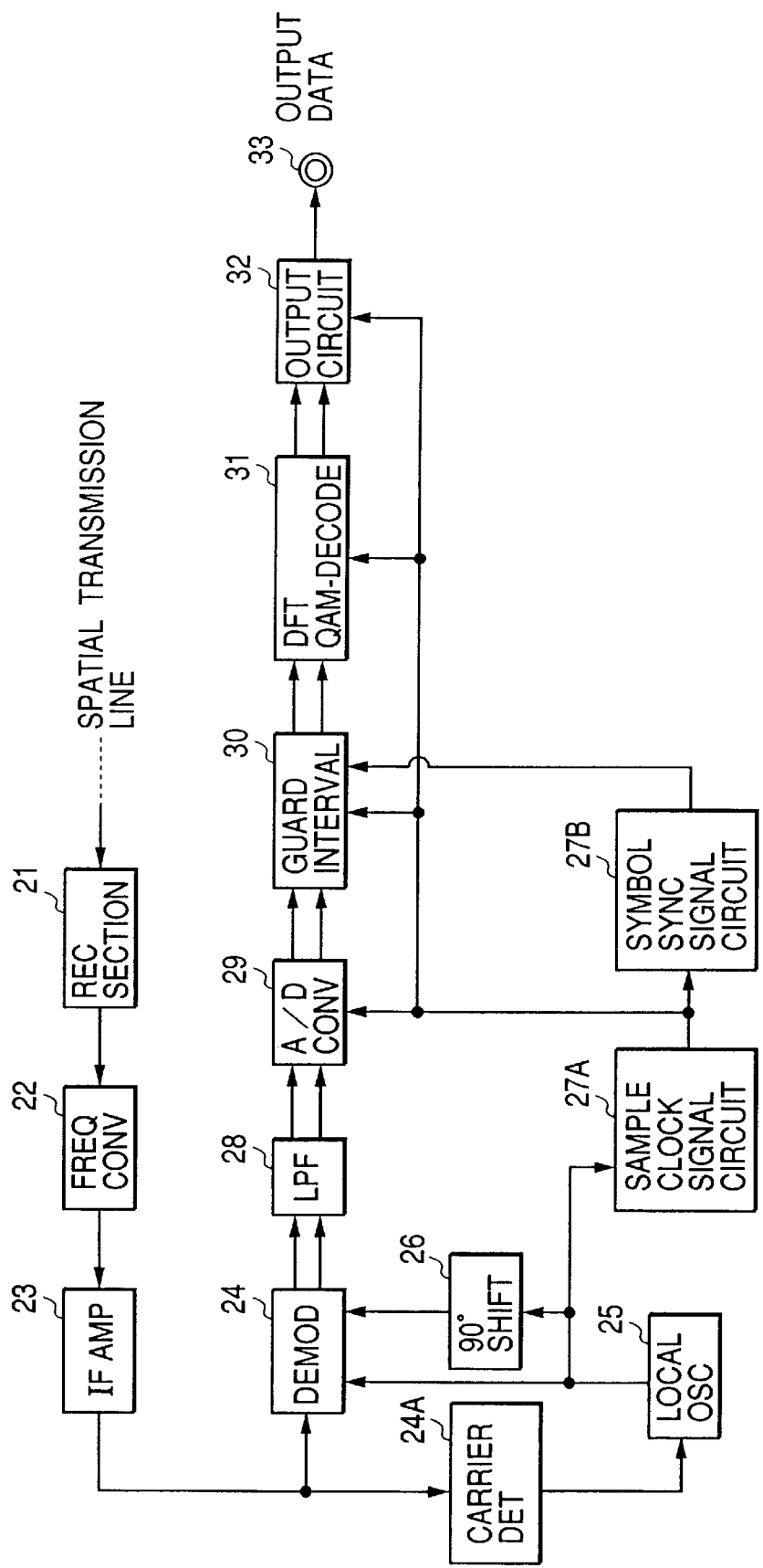
FIG. 6 is a block diagram of a signal receiving apparatus including an apparatus for decoding or demodulating an orthogonal-multi-carrier signal into data or information according to the first embodiment of this invention.

FIG. 6 shows a signal receiving apparatus including an apparatus for decoding or demodulating an orthogonal-multi-carrier signal into data or information according to the first embodiment of this invention. The signal receiving apparatus of FIG. 6 is able to accept an RF OFDM signal transmitted by the signal transmitting apparatus of FIG. 5.

With reference to FIG. 6, a receiving section 21 includes a reception antenna which catches an RF OFDM signal transmitted from, for example, the signal transmitting apparatus of FIG. 5 via the spatial transmission line (the air). The RF OFDM signal has 128 RF orthogonal multiple carriers which are modulated in accordance with transmitted baseband signals respectively. The receiving section 21 includes an RF amplifier which enlarges the caught RF OFDM signal.

An output RF OFDM signal from the RF amplifier in the receiving section 21 is fed to a frequency converter 22, being converted into a corresponding IF OFDM signal thereby. The IF OFDM signal has 128 IF orthogonal multiple carriers which are modulated in accordance with transmitted baseband signals respectively. The frequency converter 22 includes a local oscillator and a mixer. In the frequency converter 22, the RF OFDM signal and the output signal of the local oscillator are mixed by the mixer so that the RF OFDM signal is converted into the IF OFDM signal.

The IF OFDM signal is fed from the frequency converter 22 to an IF amplifier 23, being enlarged to a desired level thereby. The output IF OFDM signal from the IF amplifier 23 is fed to a quadrature demodulator 24 and a carrier detecting circuit 24A.

The carrier detecting circuit 24A includes a PLL (phase locked loop) circuit having a combination of a phase comparator (a multiplier), an LPF, a VCO (voltage-controlled oscillator), and a 1/4 frequency divider. The PLL circuit recovers the carriers in the IF OFDM signal. An output signal of the carrier detecting circuit 24A, which corresponds to the recovered carriers, is fed to a local oscillator 25. The local oscillator 25 is designed to extract the central-frequency carrier among the carriers in the IF OFDM signal with a negligible phase error. The local oscillator 25 outputs a signal corresponding to the extracted central-frequency carrier.

Thus, the local oscillator 25 reproduces a local oscillator signal used in a transmitter side.

The IF OFDM signal (or the RF OFDM signal) is composed of the central-frequency carrier and the other carries with frequencies which are spaced at equal intervals. The frequencies of the carriers neighboring the central-frequency carrier are spaced from the frequency of the central carrier by only a small frequency interval.

Accordingly, it is preferable that the extraction of the central-frequency carrier is executed by a high-selectivity circuit.

The local oscillator 25 uses a high-selectivity circuit. Specifically, the local oscillator 25 includes a PLL circuit for extracting the central-frequency carrier from the carriers outputted by the carrier detecting circuit 24A. A voltage-controlled oscillator (VCO) in the PLL circuit in the local oscillator 25 uses a voltage-controlled crystal oscillator (VCXO) which can oscillate at a frequency variable in a given small range around the frequency of the central carrier. In addition, an LPF in the PLL circuit has a cut-off frequency adequately low with respect to the frequency intervals between the carriers.

The output signal of the local oscillator 25 is fed to the quadrature demodulator 24. The output signal of the local oscillator is also fed to a 90° phase shifter 26. The device 26 shifts the phase of the output signal of the local oscillator 25 by 90°. The phase-shift resultant signal is outputted from the device 26 to the quadrature demodulator 24. In this way, a pair of reproduced local oscillator signals having a quadrature relation are fed to the quadrature demodulator 24. In response to the quadrature signals, the IF OFDM signal is demodulated by the quadrature demodulator 24 into baseband signals corresponding to a real part and an imaginary part (an in-phase signal and a quadrature signal, that is, an I signal and a Q signal) respectively.

Output signals from the quadrature demodulator 24 are fed to an LPF 28. Only components of the output signals of the quadrature demodulator 24, which occupy a desired frequency band, are passed through the LPF 28. Output signals of the LPF 28 which have analog forms are fed to an A/D converter 29. The output signals of the LPF 28 are subjected to sampling processes and are converted by the A/D converter 29 into corresponding digital signals (digital I and Q signals). The A/D converter 29 operates in response to a sample clock signal fed from a sample clock signal generating circuit 27A.

The sample clock signal generating circuit 27A receives the output signal of the local oscillator 25. The sample clock signal generating circuit 27A produces the sample clock signal in response to the output signal of the local oscillator 25. The sample clock signal generating circuit 27A outputs the sample clock signal to the A/D converter 29 and other circuits 27B, 30, 31, and 32 which will be explained later.

The output signals of the A/D converter 29 are fed to a guard interval processing circuit 30. The guard interval processing circuit 30 extracts time-portions of the output signals (the digital I and Q signals) of the A/D converter 29 which occupy every DFT window corresponding to an effective symbol interval. The guard interval processing circuit 30 operates in response to the sample clock signal fed from the sample clock signal generating circuit 27A and also a symbol sync signal (a symbol clock signal) fed from a symbol sync signal generating circuit 27B. Output signals (digital I and Q signals) of the guard interval processing circuit 30 are fed to a DFT QAM (discrete Fourier transform, quadrature amplitude modulation) decoding circuit 31.

The DFT QAM decoding circuit 31 divides every 1-symbol time segment of the output I signal from the guard interval processing circuit 30 into eight successive 1/8-symbol time segments in response to the sample clock signal fed from the sample clock signal generating circuit 27A. The DFT QAM decoding circuit 31 adds and averages at least two of the eight successive 1/8-symbol time segments of the output I signal from the guard interval processing circuit 30 into a 1-unit time segment of a second I signal (a second real-part signal). Also, the DFT QAM decoding circuit 31 divides every 1-symbol time segment of the output Q signal from the guard interval processing circuit 30 into eight successive 1/8-symbol time segments in response to the sample clock signal fed from the sample clock signal generating circuit 27A. The DFT QAM decoding circuit 31 adds and averages at least two of the eight successive 1/8-symbol time segments of the output Q signal from the guard interval processing circuit 30 into a 1-unit time segment of a second Q signal (a second imaginary-part signal).

A time-base expansion process may be implemented during the conversion of the first I and Q signals into the second I and Q signals by the DFT QAM decoding circuit 31.

The DFT QAM decoding circuit 31 subjects the second I and Q signals to processing which corresponds to 128-point complex discrete Fourier transform (128-point DFT) in response to the sample clock signal fed from the sample clock signal generating circuit 27A. According to the complex discrete Fourier transform processing, the DFT QAM decoding circuit 31 derives the levels of baseband carriers in the second real-part signal and the second imaginary-part signal. In the DFT QAM decoding circuit 31, the derived real-part levels and the derived imaginary-part levels are compared with reference demodulation output levels so that the states of transmitted digital signals are determined. In this way, the transmitted digital information is recovered.

The DFT QAM decoding circuit 31 is of the 128-point DFT type. Therefore, the DFT QAM decoding circuit 31 is simpler in structure and lower in cost than a DFT QAM decoding circuit of a 1024-point DFT type.

Output signals of the DFT QAM decoding circuit 31 which correspond to the recovered digital signals are fed to an output circuit 32. The output signals of the DFT QAM decoding circuit 31 are subjected by the output circuit 32 to parallel-to-serial (P/S) conversion, being rearranged and combined into a serial-form digital signal. The output circuit 32 operates in response to the sample clock signal fed from the sample clock signal generating circuit 27A. The serial-form digital signal is transmitted from the output circuit 32 to an external device (not shown) via an output terminal 33.

The symbol sync signal generating circuit 27B receives the sample clock signal from the sample clock signal generating circuit 27A. The symbol sync signal generating circuit 27B produces the symbol sync signal in response to the sample clock signal. The symbol sync signal generating circuit 27B outputs the symbol sync signal to the guard interval processing circuit 30.

Second Embodiment

A second embodiment of this invention is similar to the first embodiment thereof except for the following design changes. In the second embodiment of this invention, "N" or less orthogonal multiple carriers are generated by N-point IDFT where "N" denotes a predetermined natural number different from 128. In addition, a signal decoding side implements N-point DFT.

Third Embodiment

A third embodiment of this invention is similar to the second embodiment thereof except for the following design change. The third embodiment of this invention implements a double over-sampling process during which "N/2" or less orthogonal multiple carriers are generated by N-point IDFT.

Fourth Embodiment

A fourth embodiment of this invention is similar to the first embodiment thereof except for the following design changes. In the fourth embodiment of this invention, a DFT QAM decoding circuit 31 (see FIG. 6) selects and uses only one from among eight successive 1/8-symbol time segments of the output I signal of a guard interval processing circuit 30 (see FIG. 6) as a 1-unit time segment of a second I signal (a second real-part signal). Also, the DFT QAM decoding circuit 31 (see FIG. 6) selects and uses only one from among eight successive 1/8-symbol time segments of the output Q signal of the guard interval processing circuit 30 (see FIG. 6) as a 1-unit time segment of a second Q signal (a second imaginary-part signal).

Fifth Embodiment

A fifth embodiment of this invention is similar to the first embodiment thereof except for the following design changes. In the fifth embodiment of this invention, a first OFDM signal having "N" or less orthogonal multiple carriers is generated by N-point IDFT where "N" denotes a predetermined natural number equal to or greater than 2. Every 1-unit-corresponding time segment of the first OFDM signal is repeated "M" times to generate every 1-symbol-corresponding time segment of a second OFDM signal, where "M" denotes a predetermined natural number equal to or greater than 2. The second OFDM signal has a thinned set of "N" or less orthogonal multiple carriers spaced at M-carrier intervals.

In the fifth embodiment of this invention, a third OFDM signal is generated by M×N-point IDFT designed so that "L" carriers including carriers corresponding to the orthogonal multiple carriers in the second digital OFDM signal will be set as holes. Here, "L" denotes a predetermined natural number between the number "N" and the number "M×N−1". The third OFDM signal has a set of "M×N−L" orthogonal multiple carriers. The third OFDM signal is assigned to, for example, a pilot signal or pilot signals. The second OFDM signal and the third OFDM signal are combined into a fourth OFDM signal which is transmitted toward a receiver side. The fourth OFDM signal has a set of "M×N+N−L" or less orthogonal multiple carriers.

In the fifth embodiment of this invention, a received and recovered OFDM signal which corresponds to the fourth OFDM signal is separated into a first sub OFDM signal and a second sub OFDM signal corresponding to the second OFDM signal and the third OFDM signal respectively. The second sub OFDM signal is subjected to M×N-point DFT. On the other hand, every 1-symbol time segment of the first sub OFDM signal is divided into "M" successive 1/M-symbol time segments. At least two of the "M" successive 1/M-symbol time segments of the first sub OFDM signal are added and averaged into a 1-unit time segment of a third sub OFDM signal which corresponds to the first OFDM signal. For every unit time interval, the third sub OFDM signal is subjected to N-point DFT.

Sixth Embodiment

A sixth embodiment of this invention is similar to one of the first, second, third, fourth, and fifth embodiments thereof except for the following design changes. A transmitter side in the sixth embodiment of this invention implements IFFT (inverse fast Fourier transform) instead of IDFT. Furthermore, a receiver side in the sixth embodiment of this invention implements FFT (fast Fourier transform) instead of DFT.

What is claimed is:

1. A method comprising the steps of:
generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; and
repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2.

2. A method comprising the steps of:
dividing every 1-symbol time segment of a first orthogonal-multi-carrier signal into "M" successive 1/M-symbol time segments, the first orthogonal-multi-carrier signal having a thinned set of "N" or less orthogonal multiple carriers spaced at M-carrier intervals, where "M" denotes a predetermined natural number equal to or greater than 2, and "N" denotes a predetermined natural number equal to or greater than 2;
adding and averaging at least two of the "M" successive 1/M-symbol time segments of the first orthogonal-multi-carrier signal into a 1-unit time segment of a second orthogonal-multi-carrier signal; and
subjecting the second orthogonal-multi-carrier signal to N-point discrete Fourier transform for every unit time interval.

3. A method comprising the steps of:
generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2;
repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2;
generating a third orthogonal-multi-carrier signal through M×N-point inverse discrete Fourier transform, the third orthogonal-multi-carrier signal having "M×N−L" orthogonal multiple carriers, where "L" denotes a predetermined natural number equal to or greater than the number "N"; and combining the second orthogonal-multi-carrier signal and the third orthogonal-multi-carrier signal into a fourth orthogonal-multi-carrier signal.

4. A method as recited in claim 3, further comprising the steps of:

dividing every 1-symbol time segment of the fourth orthogonal-multi-carrier signal into "M" successive 1/M-symbol time segments;

adding and averaging at least two of the "M" successive 1/M-symbol time segments of the fourth orthogonal-multi-carrier signal into a 1-unit time segment of a fifth orthogonal-multi-carrier signal; and subjecting the fifth orthogonal-multi-carrier signal to N-point discrete Fourier transform for every unit time interval.

5. A method as recited in claim 3, wherein the third orthogonal-multi-carrier signal contains a pilot signal.

6. An apparatus comprising:

means for generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2; and means for repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2.

7. An apparatus comprising:

means for dividing every 1-symbol time segment of a first orthogonal-multi-carrier signal into "M" successive 1/M-symbol time segments, the first orthogonal-multi-carrier signal having a thinned set of "N" or less orthogonal multiple carriers spaced at M-carrier intervals, where "M" denotes a predetermined natural number equal to or greater than 2, and "N" denotes a predetermined natural number equal to or greater than 2;

means for adding and averaging at least two of the "M" successive 1/M-symbol time segments of the first orthogonal-multi-carrier signal into a 1-unit time segment of a second orthogonal-multi-carrier signal; and means for subjecting the second orthogonal-multi-carrier signal to N-point discrete Fourier transform for every unit time interval.

8. An apparatus comprising:

means for generating a first orthogonal-multi-carrier signal through N-point inverse discrete Fourier transform, the first orthogonal-multi-carrier signal having "N" or less orthogonal multiple carriers, where "N" denotes a predetermined natural number equal to or greater than 2;

means for repeating every 1-unit time segment of the first orthogonal-multi-carrier signal "M" times to generate every 1-symbol time segment of a second orthogonal-multi-carrier signal, the second orthogonal-multi-carrier signal having a thinned set of "N" or less orthogonal multiple carriers spaced at M-carrier intervals, where "M" denotes a predetermined natural number equal to or greater than 2;

means for generating a third orthogonal-multi-carrier signal through M×N-point inverse discrete Fourier transform, the third orthogonal-multi-carrier signal having "M×N−L" orthogonal multiple carriers, where "L" denotes a predetermined natural number equal to or greater than the number "N"; and means for combining the second orthogonal-multi-carrier signal and the third orthogonal-multi-carrier signal into a fourth orthogonal-multi-carrier signal.

9. An apparatus as recited in claim 8, further comprising:

means for dividing every 1-symbol time segment of the fourth orthogonal-multi-carrier signal into "M" successive 1/M-symbol time segments;

means for adding and averaging at least two of the "M" successive 1/M-symbol time segments of the fourth orthogonal-multi-carrier signal into a 1-unit time segment of a fifth orthogonal-multi-carrier signal; and means for subjecting the fifth orthogonal-multi-carrier signal to N-point discrete Fourier transform for every unit time interval.

10. An apparatus as recited in claim 8, wherein the third orthogonal-multi-carrier signal contains a pilot signal.

* * * * *